March 1, 1932.    R. S. CUNARD    1,847,070
DIRECTION SIGNAL FOR AUTOMOBILES
Filed March 26, 1930    2 Sheets-Sheet 1
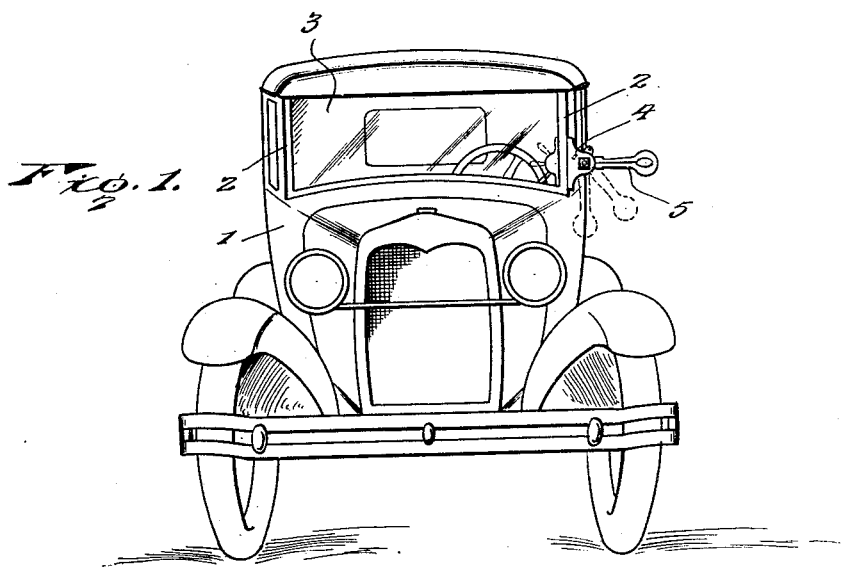
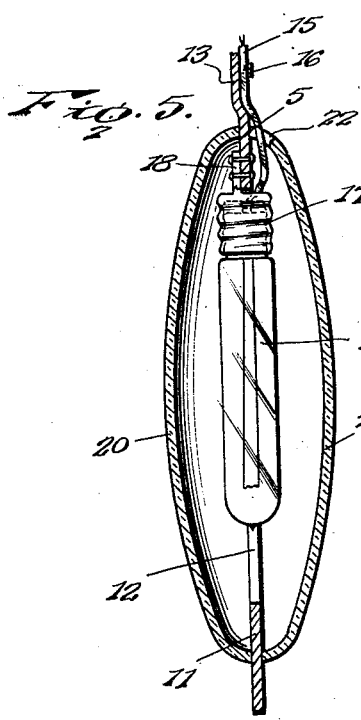
Inventor
R. S. Cunard
By Lacey & Lacey, Attorneys March 1, 1932.　　　R. S. CUNARD　　　1,847,070
DIRECTION SIGNAL FOR AUTOMOBILES
Filed March 26, 1930　　2 Sheets-Sheet 2
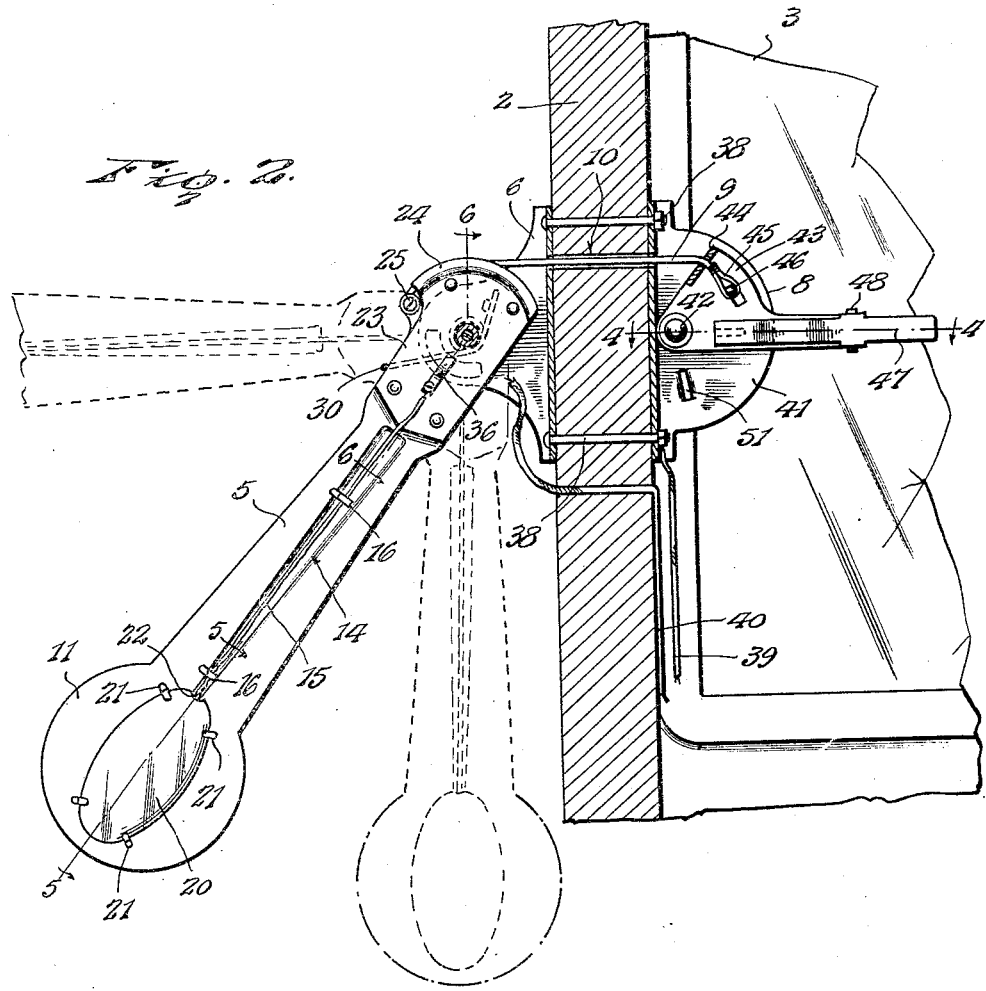
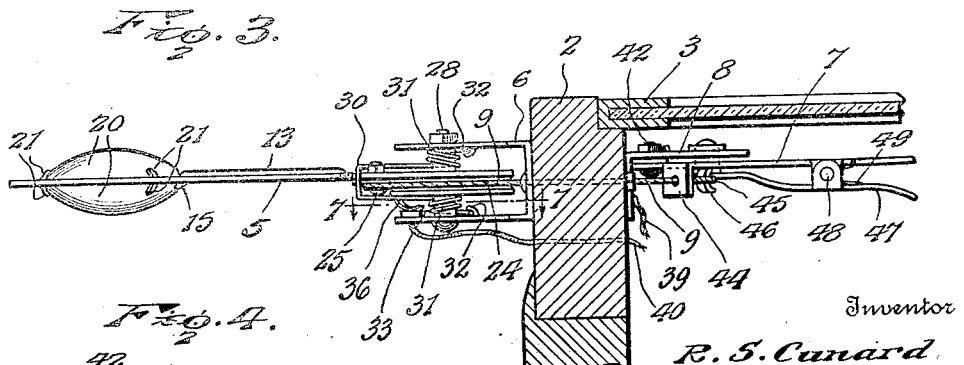

Patented Mar. 1, 1932

1,847,070

UNITED STATES PATENT OFFICE

RUSSELL S. CUNARD, OF EVERETT, PENNSYLVANIA

DIRECTION SIGNAL FOR AUTOMOBILES

Application filed March 26, 1930. Serial No. 439,211.

This invention relates to direction signals and more particularly to a signal adapted to be applied to an automobile and by means of which the driver of the automobile may signal to drivers of other automobiles or indicate his intentions to a traffic officer or persons crossing a street.

One object of the invention is to provide a signal of the semaphore type which may be applied to a closed car and operated from within the car by the driver thereby allowing the driver to very easily swing the semaphore from a position close to the car to an extended position and indicate that he is about to stop or make a turn.

Another object of the invention is to so mount the semaphore that it will be normally retained in position close to the body portion of the automobile and returned to this position when released after having been swung to an indicating position.

Another object of the invention is to so construct brackets forming part of the signal that they may be secured one against the outer face of the car body and the other against the inner face thereof and also to allow the device to accommodate itself to the thickness of the wall of the car to which the brackets are secured.

Another object of the invention is to permit the signal to be equipped with a light which is extinguished when the arm is in its normal position close to the car and cause the light to be illuminated when the arm is swung to an indicating position and thereby permit the signal to be easily seen at night.

Another object of the invention is to provide a signal of this character which is simple in construction and capable of being very easily applied.

The invention is illustrated in the accompanying drawings, wherein

Figure 1 is a view looking at the front of an automobile and showing the improved signal applied thereto, Fig. 2 is an enlarged view showing the signal and adjacent portions of an automobile body partially in section and partially in elevation, Fig. 3 is a view showing the signal in top plan and adjacent portions of the automobile body in section, Fig. 4 is a sectional view through the actuating means for the signal taken on the line 4—4 of Fig. 2.

Fig. 5 is a longitudinal sectional view through the outer end portion of the semaphore arm taken on the line 5—5 of Fig. 2, Fig. 6 is a sectional view through the inner end portion of the semaphore arm and its mounting bracket taken on the line 6—6 of Fig. 2, Fig. 7 is a sectional view taken on the line 7—7 of Fig. 3, Fig. 8 is a wiring diagram, and Fig. 9 is a wiring diagram showing a modified construction.

The automobile shown in Figure 1 and indicated in general by the numeral 1 is of a conventional closed car type and includes the usual corner posts 2 at its front between which is located the windshield 3. The improved signal, which is indicated in general by the numeral 4, is located at the front of the automobile and is attached to the front corner post at the driver's side. It consists briefly of a semaphore arm 5 pivoted to a bracket 6 secured against the outer face of the corner post or the door frame adjacent the corner post and an actuating lever 7 pivoted to a bracket 8 secured against the inner face of the corner post, the lever being connected with the semaphore arm by a flexible connection such as a small steel cable or strong wire 9 passed through a passage 10 formed in the post.

The semaphore arm 5 is formed of sheet metal and has its outer end shaped to define a head 11 in which is formed an opening 12, as shown in Figure 5. Intermediate its width the arm is pressed to form a rib 13 which serves as a reinforcing rib and also defines a seat 14 to receive a conductor wire 15 which is secured in the seat by clips 16. A socket 17 is disposed within the opening 12 and formed with an attaching lug or tongue 18 secured against one face of the arm at the inner end of the opening and the conductor wire 15 is secured to the center contact of this socket. It will thus be seen that the socket will be grounded to the arm. This socket carries a bulb 19 which extends longitudinally in the opening 12, as shown in Figure 5, and is enclosed by shields or lenses 20 formed of glass or other light transmittible material. These closures fit against the side faces of the arm about the opening where they are secured by clips 21 and one is formed with an opening or recess 22 through which the wire 15 passes. It will thus be seen that the outer or free end portion of the semaphore arm may be illuminated and permit the signal to be easily seen at night.

The inner end portion or heel of the semaphore arm has a plate 23 secured against one side face thereof, as shown in Figure 6, and the rear end of the plate is bent outwardly to form a groove 24 adapted to receive the forward end portion of the line 9 which is secured to the signal arm by a small bolt or other suitable fastener, as shown at 25. Since the rear ends of the arm and plate 23 are arcuate transversely of the arm, the arm may be easily swung from a position close to the side of the automobile to an extended indicating position and back again to its depending or neutral position without the line 9 being liable to slip out of the groove. Sleeves 26 and 27 project from the arm and plate, as shown in Figure 6, thereby forming a hub or bearing sleeve adapted to receive the bolt or pivot pin 28, the ends of which are engaged through openings in the side arms 29 of the bracket 6. By this arrangement the semaphore arm will be pivotally mounted but will be prevented from shifting longitudinally of the pivot pin. It is desired to have the arm normally remain in the depending or neutral position close to the body of the automobile, and in order to do so I employ a spring 30 formed from a strand of resilient wire. This spring is U-shaped and is disposed in straddling relation to the semaphore with its bridge portion resting upon the upper edge of the semaphore and its arms extending along opposite sides thereof. The arms of the spring are coiled about the hub extensions 26 and 27, as shown at 31, and their ends project upwardly and are engaged with abutment tongues 32 struck from the side arms of the bracket and bent inwardly, as shown in Figures 3 and 7. By this arrangement return of the semaphore arm to its depending or neutral position will be insured in case the weight of the arm is not sufficient to swing it downwardly to the depending position. A strip of insulating material 33 carrying spaced contacts 34 and 35 is secured against the inner face of one of the side arms 29 of the bracket and this strip of insulating material extends concentric to the pivot pin 28 so that when the semaphore arm is moved a contact 36 carried thereby and formed from a strip of resilient metal may successfully move into and out of engagement with the contacts 34 and 35. The contact 36 is insulated from the semaphore arm, as shown at 37, and the wire 15 has its inner end secured to this contact.

The bracket 8 which fits against the inner face of the corner post 2 is disposed opposite the bracket 6 and these two brackets are secured by bolts 38 which pass through the post, as shown in Figure 2. Therefore, the two brackets will be secured by the same bolts and will be very firmly held in place. To one of these bolts is secured a ground wire or return wire 39 leading from one side of the battery and the wire 40 leading from the other side of the battery is secured to the contact 34 while its branch wire 40' is secured to the contact 35. It will thus be seen that when the semaphore arm is swung upwardly from the depending neutral position towards a raised or horizontal position its contact 36 will first engage the contact 34 and cause the bulb 19 to be illuminated when the semaphore is in the position shown in full lines in Figure 2 and when it passes this inclined position the bulb will be extinguished until the semaphore arm reaches the horizontal position shown in full lines in Figure 1. Upon its return to the depending or neutral position the bulb will remain extinguished until the semaphore is again swung upwardly.

The flange 41 of the inner bracket has an arcuate edge and to this flange is pivotally secured the lever 7 by means of a bolt 42. The inner end portion of the lever is widened to form a head 43 carrying a perforated tongue 44 through which the line 9 is threaded and the inner end portion of the line is formed into an eye 45 engaged by a tongue struck from the flange of the bracket and bent to form a prong 46. A latch 47 extends longitudinally of the lever and is pivotally connected therewith, as shown at 48, and yieldably held in a normal position by a spring 49 so that a tooth 47' at the inner end of the latch will be urged through openings 50 and 51 formed in the bracket when the lever is swung downwardly to draw the semaphore arm upwardly. It will thus be seen that the lever may be secured in a set position and retain the semaphore arm in either the partially raised position shown in full lines in Figure 4 or in the horizontal position shown in full lines in Figure 1.

When this signal is in use, it is secured to the front post of the automobile body at the driver's seat of the car and under normal conditions the semaphore arm extends downwardly in a vertical position close to the side of the car. The lever extends upwardly at an incline, as indicated by dotted lines in Figure 2, and is, therefore, so disposed that it may be easily grasped by the operator of the automobile when he intends to stop or make a turn. When the driver of the automobile wishes to signal, he grasps the lever and draws it downwardly in order to draw upon the line 9 and swing the semaphore arm upwardly against the action of the spring 30. If it is intended to have the semaphore arm extend diagonally, as shown in Figure 2, downward movement of the lever ceases when the latch enters the opening 50 in the inner bracket but if it is intended to swing the semaphore arm to a horizontal position pressure is applied to the latch until it has passed the opening 50 and thereby allow the lever to be swung downwardly its full extent where it will be held by the latch entering the opening 51. As soon as the desired turn or stop has been made, the lever is again grasped and by pressing upon the latch its bill will be drawn out of the opening in the bracket and the lever will be allowed to move upwardly. As the lever moves upwardly, the spring 30 will return the semaphore arm to its depending or neutral position. Since the bulb will be illuminated when the semaphore arm is in the diagonal or horizontal position, the signal will be prominently displayed and easily seen at night.

In Figure 9, there has been shown a slightly modified construction. Referring to this figure it will be seen that instead of using spaced contacts 34 and 35 an elongated arcuate contact 49 may be used. This contact is engaged by the contact 36 as the arm 5 swings upwardly and the bulb 19 will remain lighted during the entire upward movement of the arm instead of only when in signaling positions and will not be extinguished until the arm returns to the depending neutral position. Therefore, there will be no danger of the signal not being noticed.

Having thus described the invention, I claim:

1. A direction signal for vehicles comprising an outer bracket, an inner bracket, a semaphore arm pivoted to the outer bracket for swinging outwardly from a neutral position to a signaling position, an actuating lever pivoted to the inner bracket and having a head at its inner end formed with a perforated side ear and a prong spaced from the ear, a flexible element having one end secured to said arm and its other end threaded through said ear and engaged by said prong, and a latch to releasably secure the lever and retain the arm in a set position.

2. A direction signal for vehicles comprising an outer bracket, an inner bracket, the outer bracket having bearing arms extending outwardly in spaced relation to each other, a pivot pin carried by said bearing arms, a semaphore arm having its inner end fitting between the bearing arms and pivoted upon said pin, a spring yieldably resisting upward movement of the semaphore arm, an actuating lever pivoted to the inner bracket, flexible means having its end secured to the lever and semaphore arm, and a latch to releasably secure the lever in a set position.

In testimony whereof I affix my signature.
RUSSELL S. CUNARD. [L. S.]